(12) United States Patent
Stratford et al.

(10) Patent No.: US 6,524,569 B1
(45) Date of Patent: Feb. 25, 2003

(54) ANIONIC-CATIONIC POLYION COMPLEXES COMPRISING ZWITTERIONIC MONOMER COMPONENT

(75) Inventors: Peter William Stratford, Surrey (GB); Jane Louise Court, Surrey (GB); Andrew Lennard Lewis, Surrey (GB)

(73) Assignee: Biocompatibles UK Limited, Surrey (GB)

( * ) Notice: Subject to any disclaimer, the term of this patent is extended or adjusted under 35 U.S.C. 154(b) by 0 days.

(21) Appl. No.: 09/831,753

(22) PCT Filed: Nov. 12, 1999

(86) PCT No.: PCT/GB99/03787

§ 371 (c)(1),
(2), (4) Date: May 14, 2001

(87) PCT Pub. No.: WO00/29481

PCT Pub. Date: May 25, 2000

(30) Foreign Application Priority Data

Nov. 13, 1998 (EP) .............................. 98309345

(51) Int. Cl.$^7$ ..................... A61K 31/74; A61K 7/075; A61K 7/08
(52) U.S. Cl. ................ 424/78.1; 424/70.21; 424/70.19; 424/70.22; 424/70.27
(58) Field of Search ............................ 424/78.1, 70.21, 424/70.19, 70.22, 70.27

(56) References Cited

FOREIGN PATENT DOCUMENTS

| JP | 7-238124 | 9/1995 |
| JP | 10-245325 | 9/1998 |
| WO | 93/01221 | 1/1993 |

OTHER PUBLICATIONS

Ishihara et al., J. Biomedical Materials Research, Vo. 28, 1347–1355 (1994).*
Database WPI, Section Ch, Week 9635, Derwent Publications Ltd., London, GB, abstract JPA 8–165491, XP–002101612.

Ishihara, et al., "Selective Adhesion and Spontaneous Fusion of Platelets on Polyion Complex Composed of Phospholipid Polymers", Adv. Biomat. Biomed. Eng. Drug Delivery Syst., 1995, pp. 227–228, XP002101610.

Ishihara, et al, "Selective adhesion of platelets on a polyion complex composed of phospholipid polymers containing sulfonate groups and quarternary ammonium groups", J. Biomed. Mater. Res., vol. 28, No. 11, 1994, pp. 1347–1355, XP–002101611.

Kataoka, et al. "Biomedical Behavior of Synthetic Polyion Complexes toward Blood Platelets", Makromol. Chem. 181, No. 7, Jul. 1980, pp. 1363–1373.

* cited by examiner

Primary Examiner—Thurman K. Page
Assistant Examiner—Blessing Fubara
(74) Attorney, Agent, or Firm—Sughrue Mion, PLLC

(57) ABSTRACT

A polyion complex (PIC) is formed of an anionic soluble polymer formed from ethylenically unsaturated monomers including at least one anionic or monomer and a cationic soluble polymer formed from ethylenically unsaturated monomer including at least one cationic monomer, in which the monomers used to form at least one of the polymers comprise a zwitterionic monomer and in which the monomers used to form at least one of the polymers include non-ionic monomer, preferably $C_{1-24}$ alkyl(meth)acrylate, in which the overall ratio of anionic groups to cationic groups in the PIC is in the range 1.5:1 to 1:1.5, and in which the polymers are combined in ratios to provide a PIC in which there are units derived from zwitterionic monomer in an amount in the range 1 to 70 mole % based on total monomer derived units in the PIC and there are units derived from non-ionic monomer in an amount in the range 0 to 60 mole % based on total monomer derived units in the PIC. The PIC is preferably swollen in water and is a flowable gel. The zwitterionic monomer is preferably 2-(methacyloyloxyethyl)-2'-(trimethylammoniumethyl) phosphate inner salt.

38 Claims, 3 Drawing Sheets

ANIONIC-CATIONIC POLYION COMPLEXES COMPRISING ZWITTERIONIC MONOMER COMPONENT

This application is a 371 PCT/GB99/03787 Nov. 12, 1999.

The present invention relates to polyion complexes, that is intimate blends of overall cationic polymers and overall anionic polymers, at least one of which said polymers has pendant zwitterionic groups to provide improved biocompatibility.

Physical gels are three-dimensional, disordered networks formed by associative forces that initiate noncovalent crosslinks. Mechanisms of interaction are numerous, including hydrogen bonding, hydrophobic interactions, crystalline segment formation and ionic association amongst others (Tanaka & Edwards, *Macromolecules,* 25, 1516, 1992). In contrast to chemical gels that have defined point crosslinks, physical gels have so-called junctions zones where linear segments of the polymer chain form ordered structures. The nature and number of these zones determine the differences between gels.

It is well known in the literature that there are water-soluble polymers that contain complexing groups, whether neutral or charged, that can form gels by ionic association. This is most commonly achieved by the presence of sufficient inorganic metal salts under the appropriate conditions. The bonding chemistry between the metal ions is specific, each forming a gel with different polymers under specific conditions of pH, ionic strength and concentration of the polymer.

Another method of obtaining a gel by complexation of relevance to this invention, is by the formation of an interpolymer complex. As its name suggests, this is a process by which two distinct polymer entities interact to form a complex. If complexation is achieved by the interaction of oppositely charged ionic groups within the two polymers, the system is termed a polyion or polyelectrolyte complex (Michaels, *Indust. & Eng. Chemistry,* 57, 32, 1965). If the interaction is between a strongly acidic polyanion and a strongly basic polycation, coulombic forces at the polyion sites results in the release of a microanion and microcation (the counterions of the original polyelectrolytes), which are then free to diffuse into the body of the solvent. The reaction will propagate rapidly from site to site, releasing the microions providing the entropy increase upon their liberation is not outweighed by the entropy decrease upon collapse and condensation of the polyion pair.

The polyion complexes have the potential to be solubilised in ternary solvent systems consisting of water, a water-soluble organic solvent like acetone and a strongly ionised simple electrolyte such as NaBr. This allows fabrication into many forms including fibres, films and coatings. This, together with their reported inherent non-thrombogenic nature, has made these materials interesting as biomaterials (Ratner & Hoffman, ACS Symposium Series 71 ed. J. D. Andrade, ACS, Washington D.C., 1976, p1).

The use of polyion complexes in medical applications has been suggested for many years. Indeed, Michaels made reference to the use of such complex solutions for potting or encapsulating aneurysms, commenting that the materials were reasonably well tolerated by the tissue. Ioplex 101 (a complex poly(triethyl-(3 & 4)-vinylphenylammonium bromide) and poly(sodium vinyl benzenesulphonate)) has been examined intensively for biomedical usage (Vogel et al. *J.Macromol. Sci., Chem.,* 4. 675, 1970; Marshall et al., *J. Biomed Mater. Res.,* 4, 357, 1970; Bruck et al., *Ann. N.Y Acad. Sci.,* 283, 332, 1977). Analogues of this system have been studied to determine the effect of charge and structure on the complex and their behaviour towards blood platelets (Kataoka et al., *Makromol. Chem.,* 179. 1121, 1978 & 181 1363, 1980) and have been used as encapsulating agents in the development of artificial liver support systems (Kataoka et al., *Jinko Zoki (Artificial Organs),* 8, 296, 1979).

Nakabayashi et al. have previously described the use of polyion complexes of polymers having zwitterionic pendant groups for the selective adhesion of platelets (*J. Biomed Mater. Res.,* 28(11), 1347, 1994 by Ishihara et al. Adv. Biomat. Biomed. Eng.

Drug Delivery Syst. (1995) 227–228 by Ishihara, K. et al., and Japanese Patent JP-A-7-238124). Their invention claims specifically the use of a ternary polymer system consisting of 2-methacroyoyloxyethyl phosphorylcholine (MPC), butyl methacrylate (BMA) and sulfur propyl methacrylate (SPM) or trimethyl ammonium propyl methacrylate (TPM). Further to this, they define the compositions in which the MPC:BMA molar ratio is between 2:98–50:50, and the ratio of these two components to the ionic monomer (SPM or TPM) is between 98:2–80:20. These systems seem to have been designed to produce coatings with weak ionic interactions that have favourable properties in terms of platelet binding and activation. The anionic and cationic polymers are water insoluble, alcohol soluble. The polyion complexes described in these references are tested as coatings on glass beads and one of the products is said to be under test for use to encapsulate activated charcoal used for an artificial liver support system. Coatings of the PIC's are produced by mixing preformed solutions at 10% solids concentrations of the terpolymers each in ethanol, dipping the substrate to be coated in the solution and allowing the alcohol to evaporate from the film of coating composition.

JP-A-08-165491 (1996) describes complexes formed of a polymer having an overall cationic charge and which further includes pendant hydrophobic groups and pendant carboxybetaine groups, with an anionic surfactant such as a-olefin sulphonates and fatty acid soaps. The complexes are flexible solids and are for use with detergent components.

JP-A-10-245325 (1998) describes hair setting compositions comprising a cationic polymer having pendant hydrophobic groups, and a polymer having pendant carboxybetaine groups and pendant hydrophobic groups.

According to the invention there is provided a new method in which a solution of an anionic polymer having an overall anionic charge and a cationic polymer having an overall cationic charge together in a solvent system comprising a first solvent and an inorganic salt, in solution, is gelled by contact with water, whereby the ions of the inorganic salts become dissociated from the polymer and extracted from the gel formed by electrostatic attraction between polymer bound cationic groups and polymer bound anionic groups, and is characterised in that at least one of the cationic and anionic polymers comprises zwitterionic groups.

The method of the invention thus involves a transformation of the polymer from being in a mobile solution or suspension form to being a gel. The method generally involves collapsing of the gel, that is the gel has a lower volume than the starting volume of the solution in the solvent system.

In the method, the solvent system generally comprises an organic solvent. Preferably the organic solvent is water-miscible. Most preferably the solvent system comprises at least two solvents, in which the second solvent is water.

Examples of suitable organic solvents for use in the solvent systems are alcohols, ethers, esters and, most preferably, ketones. Most preferably the solvent is a ketone such as acetone.

For a solvent system comprising two solvents, these are generally used in a ratio in the range 5:1 to 1:5. Preferably the range of organic solvent water is in the range 2:1 to 1:5, preferably 1:1 to 1:4.

The inorganic salts should be soluble in the solvent system. Where the solvent system contains water, therefore, the salt should be water-soluble, for instance at a concentration of at least 10% by weight. Preferably the salt is soluble in a concentration of at least 20% by weight.

Preferably the salt comprises a single, preferably monovalent metal salt. Di- or higher valent metal salts may cause premature coagulation or gelation. Likewise the anion of the salt is preferably a sinly charged anion, preferably of a strong acid, most preferably other than an oxyanion although some oxyanions may be useful. Preferably the anion is a halide. The salt is preferably a halide of an alkali metal. The alli metal is lithium, potassium, or, preferably, sodium. The halide is suitably chloride, bromide or iodide.

The salt is preferably present in the solvent system in an amount of at least 2% by weight, preferably at least 5% by weight, for instance up to 20% by weight. Preferably the salt is present in an amount in the range 5 to 15% by weight.

In the method of the invention, the polymer bound cationic and anionic groups may comprise charged atoms in the backbone of the molecule. Cationic groups formed in the backbone of the polymer may, for instance, be secondary, tertiary or quaternary ammonium groups. Preferably, however, the cationic and anionic groups of the polymers are pendant groups. Likewise the zwitterionic monomer is preferably a pendant group.

The individual polymers used in the method of the invention are preferably water-soluble, for instance produce a clear solution at a concentration of at least 1%, more preferably at least 5%, by weight.

The mixed solution of the two polymers in the solvent system may be generated by mixing together preformed solutions of the individual polymers in portions of the solvent system, or components thereof It is generally preferred that all of the components are present in combination when the polymers first contact one another, in order to avoid premature gelling. Mixing procedures generally involve adequate stirring and temperatures which provide the desired solubility.

The individual polymers may be of low or high molecular weight. Preferably the molecular weight is low enough for the solution of the individual monomer in a single solvent to be mobile and of low viscosity, to optimise handling. It is preferred that the inherent viscosity of the polymer solutions according to the test provided hereinafter is in the range 5 to 500 mPa.s, more preferably in the range 10 to 300 mPa.s, for instance in the range 20 to 150 mPa.s.

In the method of the invention it is preferred that both of the polymers have zwitterionic groups, preferably zwitterionic pendant groups. It is preferred for the zwitterionic group to comprise a monovalent anion and monovalent cation. Where the zwitterion comprises an excess of anion over cation or vice versa, the zwitterionic group may function as both polymer bound anion or cation, as the case may be, and zwitterion.

In the method, it is preferred that approximately equivalent levels of anionic and cationic groups are present so that the anionic charges and cationic charges are balanced. It is preferred for the polymer mixture to have substantially no overall charge. It is believed that this characteristic optimises biocompatibility, especially haemocompatiblity. The worked examples described below show that the gels have low protein adsorption properties.

In the method of the present invention water is contacted with the solution of the mixed polymers in the solvent system by any suitable means. For instance the interface of a body of the solution with water may be provided at the surface of a coating on a substrate, or the solution may be restrained in a mould providing means for contacting the solution in the mould with water. Liquid excluded from the gel upon collapse, for instance, may be removed by evaporation or by draining from the gel. The water may be contacted with the solution by spraying, flowing or dipping.

Some of the PIC's formed by the new phase change, gelification procedure, are novel in themselves. Thus PIC's formed from combinations of certain selected polymers have not been disclosed in the prior art. It may be possible to make the PIC's by alternative processes, such as by depositing them from a mixed solvent system in which they are soluble, followed be evaporation of the solvent, that is using the general procedure described by Ishihara et al., op.cit.

Preferred zwitterions, cations and anions and monomers from which polymers used in the method of the invention are described below.

A new polyion complex according to the present invention is formed from a cationic polymer having an overall cationic charge and an anionic polymer having an overall anionic charge, in which the anionic polymer is obtainable by polymerising ethylenically unsaturated monomers comprising:
 a) 5 to 100 mole % anionic monomer having an anionic or anionisable group;
 b) 0 to 85 mole % zwitterionic monomer having a zwitterionic group; and
 c) 0 to 80 mole % nonionic monomer;
and in which the cationic polymer is obtainable by polymerising ethylenically unsaturated monomers including
 d) 5 to 100 cationic monomer having a cationic or cationisable group;
 e) 0 to 85 mole % zwitterionic monomer having a pendant zwitterionic group; and
 f) 0 to 80 mole % non ionic monomer;
in which the total units in the polyion complex derivable from nonionic monomer c and f is in the range 0 to 60 mole %, the total mole % of units in the PIC derivable from zwitterionic monomer is in the range 1 to 70 mole %, and the ratio of moles of anionic or anionisable groups in the anionic polymer to the moles of cationic or cationisable groups in the cationic polymer is in the range 1.5:1 to 1:1.5.

According to a further aspect of the present invention a new polyion complex is formed from a cationic polymer having an overall cationic charge and an anionic polymer having an overall anionic charge, in which the anionic polymer is water soluble and is obtainable by polymerising monomers including
 a) 5 to 100% anionic monomer having an anionic or anionisable group;
 b) 0 to 85 mole % zwitterionic monomer having pendant zwitterionic group; and
 c) 0 to 60 mole % non ionic monomer;
and in which the cationic polymer is water soluble and is obtainable by polymerising ethylenically unsaturated monomers including
 d) 5 to 100 mole % cationic monomer having a cationic or cationisable group;

e) 0 to 85 mole % zwitterionic monomer having a zwitterionic pendant group; and f) 0 to 60 mole % nonionic monomer;

in which the total moles of units in the PIC derivable from zwitterionic monomers in the range 1 to 70 mole %, and in which the ratio of equivalents of anionic groups in anionic polymer to equivalents of cationic groups in cationic polymer is in the range 1.5:1 to 1:1.5.

In all aspects of the invention, the total level of units derivable from nonionic monomer in the PIC is preferably at least 5 mole %.

In all aspects of the invention, the anionic polymer preferably does not include units derivable from cationic monomer and the cationic polymer preferably does not include units derivable from anionic monomer.

The components of the PIC, in terms of the cationic and anionic polymers and the monomers from which each polymer is made, are generally selected such that an aqueous gel of the novel PIC product of the novel process flows under imposition of the force rendering it capable of being pumped. For PIC's formed from cationic and anionic polymers having relatively high proportions of cationic and anionic groups, respectively, the desired properties are achievable by using relatively high proportions of zwitterionic monomer. For instance the total units derivable from zwitterionic monomer in the PIC is preferably at least 30 mole %, generally less than 50 mole %. Where the total moles of ionic monomer in the PIC is less than 30, for instance in the range 10 to 30 mole %, then the level of units in the PIC derivable from zwitterionic monomer is preferably in the range 15 to 70 mole %. Where the total moles of ionic monomer in the PIC is in the range 5 to 10 mole %, then the level of units derivable from zwitterionic monomer in the PIC is preferably in the range 70 to 30 mole %.

The ratio of equivalents of anionic groups in anionic polymer to equivalents of cationic groups in cationic polymer (not including neutralised cation/anion pairs of a zwitterionic group) is preferably in the range 1.25:1 to 1:1.25, more preferably in the range 1.1:1 to 1:1.1, preferably about 1:1. Preferably therefore the PIC have no overall charge.

The PIC should generally be water-insoluble, but water-swellable. The PIC's may absorb more than their own weight of water, often more than twice their own weight for instance up to 10 times their own weight.

The Theological properties of the PIC, for instance swollen by water, may be determined by using a variable torque oscillation test in a suitable rheometer. Such a device can determine the elasticity modulus and the viscous modulus. The present invention is directed in particular to PIC's which, when swollen in water, and subjected to the test as set out in the following paragraph have values of G' (elasticity modulus) and G"W (viscous modulus) of G' in the range 1 to 1000 and G" in the range 5 to 1000. Generally the test is conducted when the gels are fully swollen in water.

The viscoelastic properties are determined using a variable torque oscillation test (80 mN.m) using a TA instrument CSL-100 rheometer fitted with 6 cm 2° cone at 37° C.

The zwitterionic pendant group of the polymer used in the invention may have an overall charge, for instance by having a divalent centre of anionic charge and monovalent centre of cationic charge or vice-versa or by having two centres of cationic charge and one centre of anionic charge or vice-versa. Preferably, however, the zwitterion has no overall charge and most preferably has a centre of monovalent cationic charge and a centre of monovalent anionic charge.

Preferably the centre of cationic charge in the zwitterionic group is permanent, that is it is preferably a quaternary ammonium or phosphonium or tertiary sulphonium group. Preferably the anion is permanent, that is it is substantially completely ionised at in vivo pHs, for instance at pHs in the range 5 to 8. It is preferably a phosphate, phosphonate, sulphate or sulphonate anion.

The zwitterionic group may be a betaine group (ie in which the cation is closer to the backbone), for instance a sulpho-, carboxy- or phospho-betaine. A betaine group should have no overall charge and is preferably therefore a carboxy- or sulpho-betaine. If it is a phosphobetaine the phosphate terminal group must be a diester, i.e., be esterified with an alcohol. Such groups may be represented by the general formula I

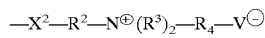

in which $X^2$ is a valence bond, —O—, —S— or —NH—, preferably —O—;

V is a carboxylate, sulphonate or phosphate diester (monovalently charged) anion;

$R^2$ is a valence bond (together with $X^2$) or alkanediyl —C(O)alkanediyl- or —C(O)NHalkanediyl preferably alkanediyl and preferably containing from 1 to 6 carbon atoms in the alkanediyl chain;

the groups $R^3$ are the same or different and each is hydrogen or alkyl of 1 to 4 carbon atoms or the groups $R^3$ together with the nitrogen to which they are attached form a heterocyclic ring of 5 to 7 atoms; and $R^4$ is alkanediyl of 1 to 20, preferably 1 to 10, more preferably 1 to 6 carbon atoms.

One preferred sulphobetaine monomer has the formula III

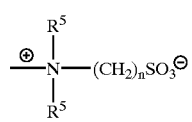

where the groups $R^5$ are the same or different and each is hydrogen or $C_{1-4}$ alkyl and n is from 2 to 4.

Preferably the groups $R^5$ are the same. It is also preferable that at least one of the groups $R^5$ is methyl, and more preferable that the groups $R^5$ are both methyl.

Preferably n is 2 or 3, more preferably 3.

Alternatively the zwitterionic group may be an amino acid moiety in which the alpha carbon atom (to which an amine group and the carboxylic acid group are attached) is joined through a linker group to the backbone of polymer A. Such groups may be represented by the general formula III

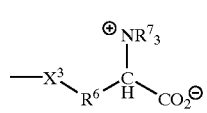

in which $X^3$ is a valence bond, —O—, —S— or —NH—, preferably —O—, $R^6$ is a valence bond (optionally together with $X^3$) or alkanediyl, —C(O)alkanediyl- or —C(O)NHalkanediyl, preferably alkanediyl and preferably containing from 1 to 6 carbon atoms; and the groups $R^7$ are the same or different and each is hydrogen or alkyl of 1 to 4 carbon atoms, preferably methyl, or two of the groups $R^7$, together with the nitrogen to which they are attached, form a heterocyclic ring of from 5 to 7 atoms, or the three group $R^7$ together with the nitrogen atom to which they are attached form a fused ring structure containing from 5 to 7 atoms in each ring.

Preferably the zwitterion has the formula IV

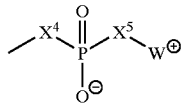

VII in which the moieties $X^4$ and $X^5$, which are the same or different, are —O—, —S—, —NH— or a valence bond, preferably —O—, and $W^+$ is a group comprising an ammonium, phosphonium or sulphonium cationic group and a group linking the anionic and cationic moieties which is preferably a $C_{1-12}$-alkylene group.

Preferably W contains as cationic group an ammonium group, more preferably a quaternary ammonium group.

The group $W^+$ may for example be a group of formula

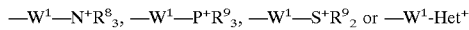

in which:

$W^1$ is alkanediyl of 1 or more, preferably 2–6, carbon atoms optionally containing one or more ethylenically unsaturated double or triple bonds, disubstituted-aryl, alkylene aryl, aryl alkylene, or alkylene aryl alkylene, disubstituted cycloalkyl, alkene cycloalkyl, cycloallyl alkylene or alkylene cycloalkyl alkylene, which group $W^1$ optionally contain one or more fluorine substituents and/or one or more functional groups; and either the groups $R^8$ are the same or different and each is hydrogen or alkyl of 1 to 4 carbon atoms, preferably methyl, or aryl, such as phenyl or two of the groups $R^8$ together with the nitrogen atom to which they are attached form a heterocyclic ring containing from 5 to 7 atoms or the three groups $R^8$ together with the nitrogen atom to which they are attached form a fused ring structure containing from 5 to 7 atoms in each ring, and optionally one or more of the groups $R^8$ is substituted by a hydrophilic functional group, and the groups $R^9$ are the same or different and each is $R^8$ or a group $OR^8$, where $R^8$ is as defined above; or Het is an aromatic nitrogen-, phosphorus- or sulphur-, preferably nitrogen-, containing ring, for example pyridine.

Preferably $W^1$ is a straight-chain alkanediyl group, most preferably 1,2-ethanediyl.

Preferred groups of the formula IV are groups of formula V:

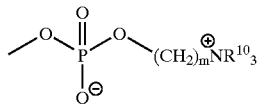

V where the groups $R^{10}$ are the same or different and each is hydrogen or $C_{1-4}$ alkyl, and m is from 1 to 4.

Preferably the groups $R^{10}$ are the same. It is also preferable that at least one of the groups $R^{10}$ is methyl, and more preferable that the groups $R^{10}$ are all methyl.

Preferably m is 2 or 3, more preferably 2.

Alternatively the ammonium phosphate ester group V may be replaced by a glycerol derivative of the formula VB, VC or VD defined in our earlier publication no WO-A-93/01221.

The zwitterionic monomer preferably has the formula VI

YBX    VI wherein

B is a straight or branched alkanediyl, or alkanediyloxaalkanediyl or alkanediyl oligo (oxaalkanediyl) chain optionally containing one or more fluorine atoms up to and including perfluorinated chains or, if X or Y contains a terminal carbon atom bonded to B, a valence bond;

X is the zwitterionic group; and

Y is an ethylenically unsaturated polymerisable group selected from

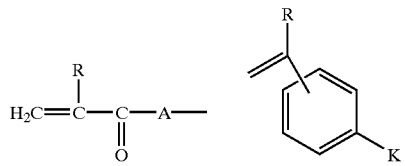

$CH_2$=$C(R)$—$CH_2$—O—, $CH_2$=$C(R)$—$CH_2OC(O)$—, $CH_2$=$C(R)OC(O)$—, $CH_2$=$C(R)$—O—, $CH_2$=$C(R)CH_2OC(O)N(R^{11})$—, $R^{12}OOCCR$=$CRC(O)$—O—, $RCH$=$CHC(O)O$—, $RCH$=$C(COOR^{12})CH_2$—$C(O)$—O—,

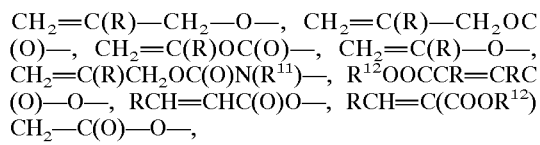

wherein:

R is hydrogen or a $C_1$–$C_4$ alkyl group;

$R^{11}$ is hydrogen or a $C_1$–$C_4$ alkyl group or $R^{11}$ is —B—X where B and X are as defined above; and $R^{12}$ is hydrogen or a $C_{1-4}$ alkyl group or BX where B and X are as defined above;

A is —O— or —$NR^{11}$;

K is a group —$(CH_2)_pOC(O)$—, —$(CH_2)_pC(O)O$—, —$(CH_2)_pOC(O)O$—, —$(CH_2)_pNR^{13}$—, —$(CH_2)_pNR^{13}C(O)$—, —$(CH_2)_pC(O)NR^{13}$—, —$(CH_2)_pNR^{13}C(O)O$—, —$(CH_2)_pOC(O)NR^{13}$—, —$(CH_2)_pNR^{13}C(O)NR^{13}$— (in which the groups $R^{13}$ are the same or different), —$(CH_2)_pO$—, —$(CH_2)_pSO_3$—, or, optionally in combination with B, a valence bond and p is from 1 to 12 and $R^{13}$ is hydrogen or a $C_1$–$C_4$ alkyl group.

Preferably Y is a group $CH_2$=$C(R)COA$—, in which R is H or methyl, preferably methyl, and in which A is preferably O.

B is preferably an alkanediyl group of 1 to 12, preferably 2 to 6 carbon atoms, most preferably group $(CH_2)_q$ in which q is 2 to 6.

Each of the cationic and anionic monomers may be represented by the formula VII $Y^1B^1Q$    VII in which
- $Y^1$ is selected from the same groups as Y
- $B^1$ is selected from the same groups as B; and
- Q is an ionic or ionisable group. Q may be a cationic group $Q^1$ or an anionic group $Q^2$.

In some embodiments of the present invention, a polycationic polymer will have permanently cationic pendant groups. These may be quaternary ammonium or phosphonium groups. In other embodiments, the cationic group may not be a permanent cation. It may be a weak or a strong base. For instance it may be selected so as to provide pH sensitivity whereby the degree of attraction between the two first polymers may be controlled by the pH.

Likewise, the anion may be the anion of a weak or strong acid, selected so as to be pH sensitive or insensitive within a predetermined pH range, as desired.

A suitable cationic group $Q^1$ is preferably a group $N^+R^1_3$, $P^+R^1_3$ or $S^+R^1_2$ in which the groups $R^1$ are the same or different and are each hydrogen, $C_{1-4}$-alkyl or aryl (preferably phenyl) or two of the groups $R^1$ together with the heteroatom to which they are attached from a saturated or unsaturated heterocyclic ring containing from 5 to 7 atoms. Preferably the cationiic group is permanently cationic, that is each $R^1$ is other than hydrogen. Preferably the cationic group is $N^+R^1_3$ in which each $R^1$ is $C_{1-4}$-alkyl, preferably methyl.

Suitable anionic groups $Q^2$ are carboxylate, carbonate, sulphonate, sulphate, phosphonate or phosphate. Preferably the anionic group is monovalent. A sulphonate group is particularly convenient.

Another suitable type of cationic monomer copolymerisable with ethylenically unsaturated monomers is diallyl dialkyl ammonium halide, for instance diallyl dimethyl ammonium chloride.

Nonionic monomer included in either or both of the cationic and anionic polymer is selected so as to confer desired solubility, hydrophilicity or hydrophobicity properties, viscosity properties on the individual polymers and on the PIC. Hydrophobic groups may provide inter or intra molecular interactions with hydrophobic groups, or with substrates or biological compounds in contact with the PIC in use.

Preferably a nonionic monomer has the general formula VIII

    VIII in which
- $Y^2$ is selected from the same groups as Y; and
- $R^{14}$ is a nonionic organic group which is an optionally substituted $C_{1-24}$-alkyl or -alkenyl group. Optional substituents in the alkyl or alkenyl group are hydroxyl groups, halogen atoms, alkoxy and oligo-alkoxy groups, in which the alkoxy groups have 1–6, preferably 2 or 3 carbon atoms, aryl groups, preferably optionally substituted phenyl groups (optional substituents in a phenyl group being hydroxyl groups, halogen atoms or alkyl groups), acyl groups, especially $C_{1-6}$-alkanoyl groups, acyloxy groups, especially $C_{1-6}$-alkanoyloxy groups or acylamino groups, especially $C_{1-6}$-alkanoyl amino, in any of which alkanoyl and acyl groups there may be substituents selected from halogen atoms and hydroxyl groups. Preferred groups $R^{14}$ are $C_{1-24}$ unsubstituted alkyl, more preferably $C_{4-18}$ alkyl.

Where the PIC is used as a gel swollen with a liquid, the liquid may be derived from, that is consist of, solvents from which the anionic and cationic polymers are presented in a method of forming the PIC by mixing two preformed solutions. Since each of the polymers is preferably water-soluble, and since it may often be convenient for the PIC to be swollen in water, preferably both the anionic and cationic polymers are dissolved in an aqueous solvent.

In the method of the invention by admixing two preformed solutions, each of the solutions preferably contains polymer in amounts in the range 0.1 to 50% by weight, preferably in the range 1 to 50%, for instance in the range 10 to 25% by weight.

Preferably the water-swellability of the PIC is such that the PIC will absorb deionised water in an amount of 10 to 1000% based on the weight of polymer, preferably in the range 50 to 500%.

The polymer solutions are mixed in the method of the invention so as to allow intimate contact between the counterionically charged polymers. It is preferable that, after the solutions have been mixed, that the mixture is allowed to rest for a period to develop gel properties.

The gel of the PIC swollen in a liquid may be used immediately without further processing. Alternatively it may be desirable to recover the PIC from the liquid vehicle and re-gel the PIC in an alternative solvent, or in the same type of solvent, optionally after rinsing in the same or other solvent, for instance to extract salts formed from counterions of the anionic and cationic pendant groups in the respective starting polymers (the microions).

Whilst the PIC is generally water-insoluble, it may be possible to dissolve, redissolve or disperse the PIC in a non-aqueous solvent such as an alcohol or ether solvent, or in a solvent system such as is used in the new method of the invention A solution of the PIC in such a solvent may be useful as a coating composition, for coating substrates to improve their biocompatbility.

The method of the invention may suitably be carried out in situ to provide a gel product in a desired location, such as in contact with a biological liquid or with tissue.

The PIC's of the present invention are believed to have desirable biocompatibility and are useful in environments where PIC's have previously been used such as in compositions to be used in contact with blood, for instance in embolising blood vessels. Other potential uses of the PIC's are in in situ coating of the internal surfaces of blood vessels, known as endoluminal gel-paving, as described in WO-A-9112846 and WO-A-9001969, filling of wound cavities, as fillers for various therapeutic and cosmetic purposes, e.g. for use following tumour excision, for use to improve muscle control, e.g. of sphincter muscles to control incontinence, as a supplement to synovial fluid, a filler for use in the treatment of patent ductus arteriosis, etc.

The PIC's may be used in products in which a pharmaceutically active agent or a diagnostic agent is incorporated. For instance the PIC may be a drug delivery depot from which pharmaceutically active ingredient may be delivered over time systemically or locally in a patient. A diagnostic agent may, for instance, be a radiopaque component, such as dispersed particulate radiopaque material (barium sulphate, for instance), or may be a solid device having a particular shape, such as a coil, filament, wire or thread of a metal. A radiopaque material may allow visualisation of the PIC in situ and the surrounding environment.

Figure 1:
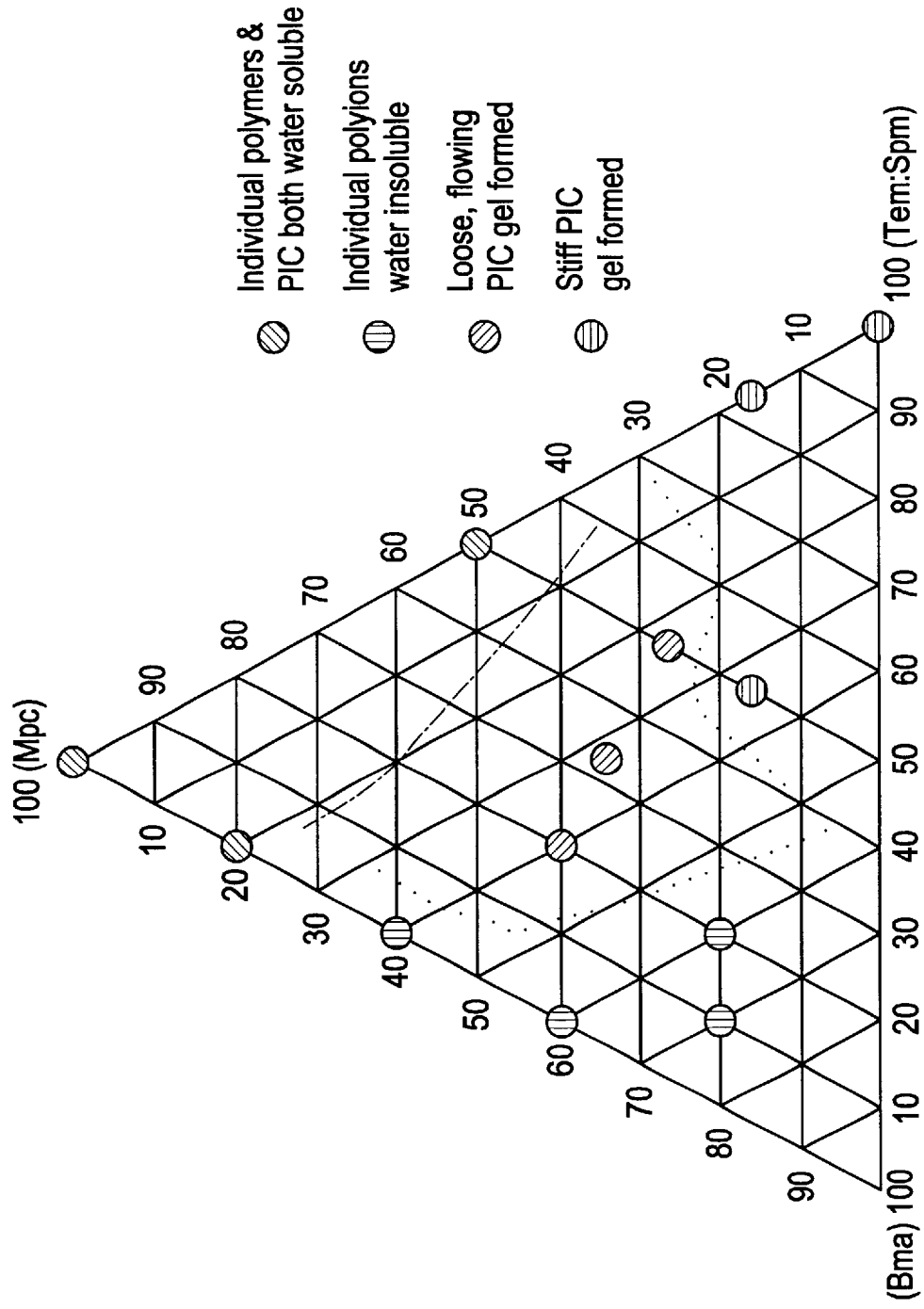
FIG. 1 is a phase diagram for the formation of polyion complexes from systems based on $Mpc_xBma_yTem_z$ and $Mpc_xBma_ySpm_z$ (see below for abbreviations)

The invention is illustrated further in the accompanying examples. In these examples, the following standard methods are used:

Inherent Viscosity

20% w/v solutions were made of each polymer using deionised water. The solution was subjected to a flow test (shear rate 1–1000 s$^{-1}$) using a TA Instruments CSL$^2$-100 Rheometer fitted with a 6 cm 2° cone at a temperature of 37° C. From the resulting viscosity vs. shear rate trace, the viscosity (Pa.s) of the solution was determined by taking the value at 200 s$^{-1}$.

Fibrinoten Adsorption

This test is carried out substantially as described in WO-A-93/01221.

Bicinchoninic Acid Protein Assay

Assessment of protein adsorption was carried out using the Micro-Bicinchoninic Acid (m-BCA) Protein Assay (Pierce & Warriner kit), which relies on the colourimetic detection of a Cu(I) complex with BCA produced upon protein reduction of Cu(II) to Cu(I). Coated and uncoated PET strips were prepared as described for the immunoassay, except that in this case they were cut in half and assayed as two 9×15 mm strips. Samples were incubated in 4 ml of 0.5 mgml$^{-1}$ of fibrinogen solution for 10 minutes at room temperature. Sample blanks of uncoated PET strips were incubated in 4 ml of PBS in the same manner. Both samples and blanks were washed in a DiaCent 2000 cell washer and then transferred to clean tubes and incubated with 100 μl PBS and 1 ml m-BCA working reagent at 60° C. A Bovine Serum Albumin (BSA) standr curve was constructed so as to give the required amount of protein in 100 μl solution Standards were incubated with 1 ml of working reagent as above. The absorbance of a 300 μl aliquot of the sample was measured in a microplate reader at 562 nm.

| Abbreviations Used: | |
|---|---|
| Monomer Code | Chemical Name |
| Mpc | Methacryloxyethyl phosphorylcholine (2-methacryloyloxyethyl-2'-trimethylammoniumethyl phosphate inner salt) |
| Bma | Butyl methacrylate (hydrophobic diluent) |
| Tem | 2-trimethylammonium ethyl methacrylate chloride salt |
| Spm | 3-methacryloyloxypropylsulphonate potassium salt |
| EtOH | ethanol |
| TFE | 2,2,2-trifluoroethanol |
| THF | tetrahydrofuran |
| MeOH | methanol |
| DI Water | deionised water |
| DCM | dichloromethane |
| PET | polyethyleneterephthalate |
| PBS | phosphate buffered saline |

EXAMPLE 1

Generic Method for the Preparation of PC-Containing Polons

The polymers were developed using free radical solution polymerisation techniques following the standard method outlined below 2-(methacryloyloxyethyl)-2'-(trimethyl-aminoniumethyl)phosphate, inner salt (Mpc) was prepared according to the method described previously WO-A-95/14702. Bma, Spm and Bma are all commercially available.

A triple-necked round bottom flask (500 ml) was equipped with a Davis condenser, a nitrogen inlet and a thermometer. The condenser was topped with a calcium chloride guard tube, and a magnetic follower was added to the flask. The reaction system then purged using nitrogen gas.

The required amount of Mpc was weighed and then stirred in a suitable reaction solvent until dissolved. To this was added the appropriate amounts of the other comonomers (ionic monomer and hydrophobic diluent if required). The initiator type and level was chosen depending upon the reaction solvent employed.

The solutions were then filtered under vacuum using a Buchner funnel, into the reaction vessel. The solution was degassed using a constant flow of nitrogen for a period of twenty minutes, after which time the nitrogen flow rate was reduced and the temperature increased to suitable level dictated by the reaction solvent in use. The polymerisation was carried out under an atmosphere of nitrogen, and maintained at temperature for a period between 16–40 hours.

When the polymerisation had finished the heat source was removed and the solution was allowed to cool to room temperature. In the case where a volatile reaction solvent or solvent mixture had been used, the solvent was removed using rotary evaporation techniques until the point at which the polymer began to foam. This foam was then further redissolved in a suitable solvent/non-solvent combination (typically 9:1DCM:MeOH) and precipitated by dropwise addition into a non solvent, typically acetone (1000 ml) with constant stirring. The precipitate was then collected using vacuum filtration under a blanket of nitrogen and dried at 50° C. in vacuo for 16 hours.

In the case where water was used as the reaction solvent, the solution was allowed to cool and the polymer purified by ultrafiltration to remove low molecular weight species. The polymer could be isolated by freeze drying for subsequent analysis.

Once isolated, the individual polymers were subjected to NMR and elemental analysis to confirm the structure.

Table 1 summarises the preparative details for a selected range of polyion compounds and Table 2 the isolation details for those polymers. Table 3 provides some characterisation for the polymers in terms of 1H NMR. Elemental analysis was acceptable compared to theoretical values for most cases (within 10% error as expected for polymers); table 4 however, summarises the key elemental data, concentrating on phosphorus:nitrogen and phosphorus:sulphur ratios in order to determine extent of Tem and Spm incorporation in the respective polycations and anions. This can subsequently be used to better define the final polymer composition versus the feed monomer ratios (as shown in table 1 to 3). The inherent viscosity of 20% w/v aqueous solutions of the polyions was obtained by rheometry, as an approximate indicator of molecular weight, and is reported in Table 5.

EXAMPLE 2

Formation of Polyion Complexes (PIC's) by Mixture of Aqueous Solutions of PC-Containing Polyelectrolytes.

Table 6 summarises some of the observations made upon mixing 20% w/v aqueous solutions of various polyions produced in Example 1 (the ratios are for the monomer in the polymerisation mixture rather than in the polymer by analysis).

0.5 g of each polymer was completely dissolved in 2.5 ml of deionised water to yield a clear solution. One solution of each of the pairs described was poured into the other and then mixed thoroughly with a spatula. In some instances, such as for the poly(Tem)/(Spm) pair, the gelation was almost instantaneous, forming a thick, swollen mass that incorporated all of the water from the system. If this was allowed to stand for a while, the gel could be seen to contract slightly, expelling some of the water from the matrix. It should be noted at this stage, that gels were mixed on an equivalent weight basis rather than using molar proportions (of monomer feed or groups in polymer as analysed).

By talking the observations made in table 6 and plotting them in terms of a ternary phase diagram, it can be seen that there are trends visible (FIG. 1). In polymer systems in which the hydrophobic component is in high, the resulting polymers are water-insoluble and so cannot form a PIC from aqueous solution (although this may still be possible from other solvent systems). In systems where the PC component is high, both the individual polymers and the resulting PIC remain water-soluble. When the correct balance of ionic/hydrophilic/hydrophobic is obtained, a gel is formed as the polyions complex. This gel tends to be 'stiffer' when the hydrophilicity is reduced and when the ionic content is higher.

Figure 2:
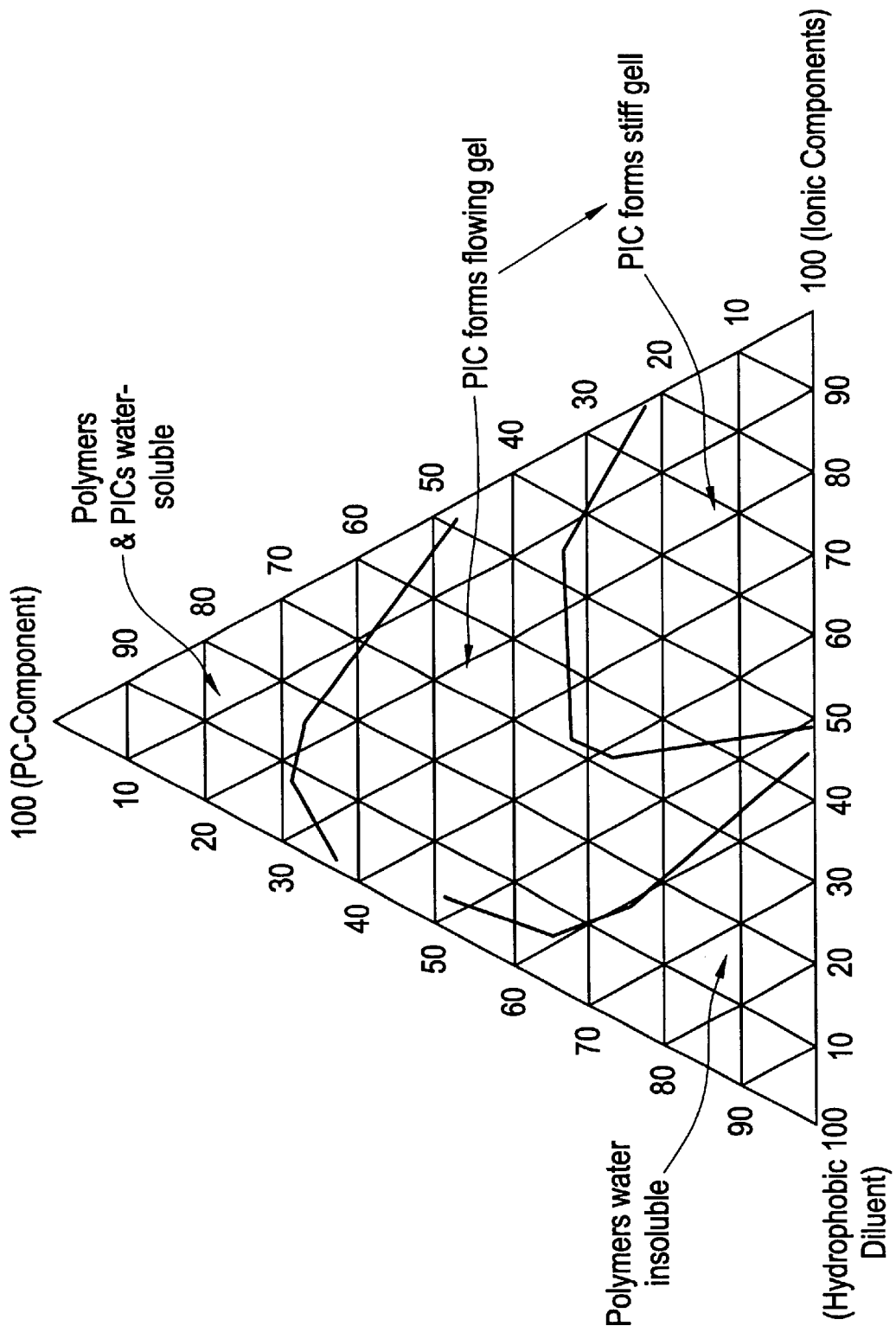
FIG. 2 is a generalised diagram for the formation of polyion complexes.

Thus, a generalisation can be made for the formation of PICs in this type of system (FIG. 2). The application in mind will determine what type of PIC will be required. For instance, if one requires the formation of a gel for filling an aneurysm, the properties required from that gel will be such that it remains in place once formed; henceforth, if its tendency is to flow, it will not be suitable.

EXAMPLE 3

Determination of the Gelation Properties of Polyion Complexes

When considering the ability of a mixture of two polyion solutions to form a gel as described in FIG. 2, it is useful to be able to quantify the observations made. In this instance, 20% (w/v) solutions of the individual polymers were made, mixed together and allowed to settle overnight. The resulting PICs were subjected to a variable torque oscillation test (10–100 mN.m) using a TA Instruments $CSL^2$-100 rheometer fitted with 6 cm 2° cone at 37° C. From this, two parameters could be measured, namely G' the elasticity modulus and G" the viscous modulus. Table 7 summarises the measurements of these parameters for a variety of PIC mixtures, taken at 80 mN.m. The polyions are defined by reference to the monomer ratios used rather than from analysis of ionic groups in the polymer.

Clearly, there a large spread in viscoelastic properties between the different PICs formed. The values are in agreement with the observations expressed in table 6 and reinforce FIGS. 1 & 2. Where values of G' and G" are low, little gelation has occurred when solutions have been mixed. Where these values are higher (ca.>10 Pa), a firm gel of has formed. When the value of G" exceeds that of G', the material has more viscous properties than elastic and it will tend to flow under applied force rather than act elastically. Where G' is greater than G" the opposite is true indicating a more elastic material with a propensity to withstand applied force. This is a useful measure of a materials' potential behaviour in a particular application. For instance, if an aneurysm-filling material is considered, it would be desirable to obtain a gel that will not wash out of the void under the influence of blood flow.

EXAMPLE 4

Gelation from Solvent System

Figure 3:
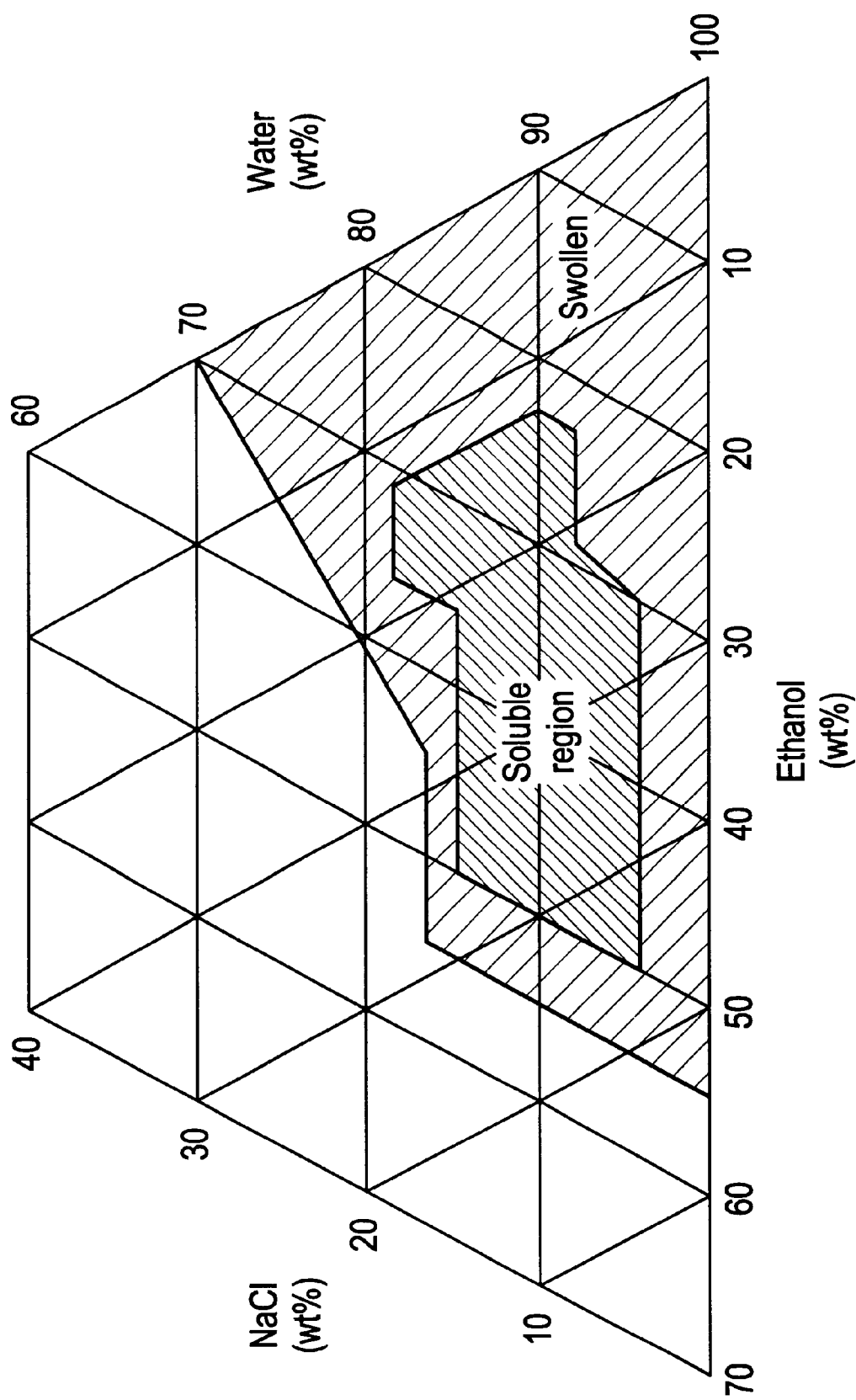
FIG. 3 is a phase diagram for the formation of polyion complexes from systems based on $Mpc_xGma_yTem_z$ and $Mpc_xBma_ySpm_z$.

A solubility study was performed on PC-PICs. They were found to be soluble in ternary solvent mixtures of water, ethanol and NaCl. The results are shown in the ternary phase diagram FIG. 3.

EXAMPLE 5

Biological Performance of PC PIC's

A solution of the PIC could then be used to produce reproducible coatings on PET that could be used for biological evaluation. Strips were subjected to a double antibody fibrinogen assay (Fg) and micro bicinchoninic acid protein assay ($\mu$-BCA) in order to gain an appreciation of the extent of protein interaction with the materials. Table 8 summarises the results. Again the polyions are defined by reference to the ratios of monomers used.

From the data it can be seen that coatings of polyion complexes exhibit a lower degree of protein adsorption than the PET control strip. The comparison PIC made from mixing the homopolymers of Tem and Spm (5.3) is less effective at lowering the protein adsorption than those PIC's that contain Mpc. This is consistent with the view that Mpc improves the 'biocompatibility' of surfaces.

TABLE 1

Preparative Details for a Series of Polyions

| Polymer | Solvent | Reaction Time (mins) | Reaction Temp (° C.) | Initiator Type | [Initiator] (%) | Scale (g) | Solids (%) |
|---|---|---|---|---|---|---|---|
| MpcTem | D.I. Water | 24 | 80 | APS | 1 | 30 | 15 |
| MpcSpm | D.I. Water | 24 | 80 | APS | 1 | 30 | 15 |
| MpcBmaTem | EtOH | 24 | 70 | AIBN | 1 | 30 | 15 |
| MpcBmaSpm | EtOH | 24 | 70 | AIBN | 1 | 30 | 15 |
| $Mpc_{40}Bma_{40}Tem_{20}$ | THF/EtOH | 18 | 70 | AIBN | 1 | 25 | 12.5 |
| $Mpc_{40}Bma_{40}Spm_{20}$ | TFE | 24 | 70 | AIBN | 1 | 25 | 12.5 |
| $Mpc_{15}Bma_{35}Tem_{50}$ | EtOH | 18 | 70 | AIBN | 1 | 25 | 12.5 |
| $Mpc_{15}Bma_{35}Spm_{50}$ | EtOH | 18 | 70 | AIBN | 1 | 25 | 12.5 |
| $MpcTem_2$ | EtOH | 24 | 60 | AIBN | 0.2 | 15 | 15 |
| BmaSpm | TFE | 40 | 60 | AIBN | 0.4 | 30 | 12.5 |

TABLE 1-continued

Preparative Details for a Series of Polyions

| Polymer | Solvent | Reaction Time (mins) | Reaction Temp (° C.) | Initiator Type | [Initiator] (%) | Scale (g) | Solids (%) |
|---|---|---|---|---|---|---|---|
| $Mpc_{15}Tem_{85}$ | D.I. Water | 24 | 80 | APS | 1 | 25 | 12.5 |
| $Mpc_{15}Spm_{85}$ | D.I. Water | 24 | 80 | APS | 1 | 25 | 12.5 |
| Poly(Tem) | D.I. Water | 24 | 86 | APS | 1 | 25 | 12.5 |
| Poly(Spm) | D.I. Water | 24 | 86 | APS | 1 | 25 | 12.5 |

TABLE 2

Isolation Details for a Series of Polyions

| Polymer | Redissolution Solvents | Precipitation Solvent | Yield (g) | Yield (%) | Appearance | Comments |
|---|---|---|---|---|---|---|
| MpcTem | — | — | 15.8 | 53 | Fine, white powder | Isolated by freeze-drying |
| MpcSpm | — | — | 27 | 90 | Fine, white powder | Isolated by freeze-drying |
| MpcBmaTem | 120 ml DCM/5 ml MeOH | 780 ml Acetone | 22.6 | 75 | Fine, white powder | |
| MpcBmaSpm | 120 ml DCM/5 ml MeOH | 780 ml Acetone | 16.9 | 56 | Grey-white powder | |
| $Mpc_{40}Bma_{40}Tem_{20}$ | — | 200 ml Acetone | 13.8 | 55 | Fine, white powder | |
| $Mpc4_{40}Bma_{40}Spm_{20}$ | 140 ml DCM/80 ml TFE | 1.21 Acetone | 17.3 | 69 | Fine, white powder | |
| $Mpc_{15}Bma_{35}Tem_{50}$ | 120 ml DCM/5 ml MeOH | 780 ml Acetone | 16.3 | 65 | Lumpy white solid | |
| $Mpc_{15}Bma_{35}Spm_{50}$ | 120 ml DCM/5 ml MeOH | 780 ml Acetone | 6.6 | 27 | Lumpy white solid | Difficult to isolate (low Mw?) |
| $MpcTem_2$ | 48 ml DCM/4 ml MeOH | 500 ml Acetone | 13.5 | 95 | White solid | |
| BmaSpm | 50 ml DCM/20 ml TFE | 1.51 Acetone | 26.8 | 89 | Stringy solid | |
| $Mpc_{15}Tem_{85}$ | — | — | ~22.5 | 90 | White solid | Estimated yield by drying |
| $Mpc_{15}Spm_{85}$ | — | — | ~22.5 | 90 | White solid | down a sample of solutlon |
| Poly(Tem) | — | — | ~22.5 | 90 | White solid | Estimated yield by drying |
| Poly(Spm) | — | — | ~22.5 | 90 | White solid | down a sample of solution |

TABLE 3

Summary of $^1H$ NMR Data for a Series of Polyions.

| Polyion | Solvent | Description (Peak Postions in δ) | Comments |
|---|---|---|---|
| Poly(Spm) | $D_2O$ | 0.9–1.1(3 peaks, b); 1.95(b); 2.15(s); 3.0(triplet, —C$\underline{H}_2$—S—); 4.15(b) | As expected for structure |
| Poly(Tem) | $D_2O$ | 0.9–1.2(3 peaks, b); 2.05(b); 3.3(s, $N^+$(C$\underline{H}_3$)$_3$); 4.85(m); 4.5(b) | As expected for structure |
| $Mpc_{13}Spm_{85}$ | $D_2O$ | 0.8–1.2(2 peaks, b); 1.9(b); 2.15(s); 3.0(triplet, —C$\underline{H}_2$—S—); 3.3(s, $N^+$(C$\underline{H}_3$)$_3$); 3.7; 4.1–4.3(2 peaks, b) | Integration of ($N^+$(Me)$_3$) vs. —C$\underline{H}_2$—S gives expected formula |
| $Mpc_{15}Tem_{85}$ | $CD_3OD$ | 0.9–1.3(3 peaks, b); 2.0(b); 3.26 + 3.31(overlapping, $N^+$(Me)$_3$ from Mpc and Tem); 3.7–4.7(6 peaks, overlapping, b) | Cannot integrate Mpc vs. Tem, peaks to close. |
| MpcBmaSpm | $CD_3OD$ | 0.8–1.3(3 peaks, b); 1.45(—C$\underline{H}_2$—CH$_3$); 1.65(—O—CH$_2$—C$\underline{H}_2$—); 1.95; 2.15; 2.9(triplet, —C$\underline{H}_2$—S—); 3.3(s, $N^+$(C$\underline{H}_3$)$_3$); 3.7; 3.9–4.4(3 peaks, b) | Integration of Mpc vs. Spm and elemental analysis suggests more like ~$Mpc_{25}Bma_{35}Spm_{40}$. Monomer contamination observed. |
| MpcBmaTem | $CD_3OD$ | 0.9–1.2(2 peaks, b); 1.45(—C$\underline{H}_2$—CH$_3$); 1.65(—O—CH$_2$—C$\underline{H}_2$—); 1.95(b); 3.3 + 3.32(overlapping, $N^+$(Me)$_3$ from Mpc and Tem); 3.7–4.7(8 peaks overlapping, b) | Cannot integrate Mpc vs. Tem, peaks to close. |
| MpcSpm | $D_2O$ | 0.9–1.1(2 peaks, b); 1.9–2.2(2 peaks, b); 2.95(vague triplet, —C$\underline{H}_2$—S—); 3.3(s, $N^+$(C$\underline{H}_3$)$_3$); 3.7; 4.1–4.4(3 peaks, b) | Integration shows 50:50 Mpc:Spm as expected. |
| MpcTem | $D_2O$ | 0.9–1.3(2 peaks, b); 2.2(b); 3.3 + 3.33(overlapping, $N^+$(Me)$_3$ from Mpc and Tem); 3.7; 3.9, 4.1–4.6(3 peaks, b) | Cannot integrate Mpc vs. Tem, peaks to close. |
| BmaSpm | DMSO | 0.7–1.0(2 peaks, b); 1.35(—C$\underline{H}_2$—CH$_3$); 1.55(—O—CH$_2$—C$\underline{H}_2$—); 1.85; 2.5(—C$\underline{H}_2$—S— is masked by DMSO); 3.9(b) | Integration not possible as residual undeuterated DMSO masks Spm. |
| $MpcTem_2$ | $CD_3OD$ | 1.0–1.3(2 peaks, b); 2.15(b); 3.36 + 3.44 33(overlapping, $N^+$(Me)$_3$ from Mpc and Tem); 3.8–4.7(7 peaks overlapping, b) | Cannot integrate Mpc vs. Tem, peaks to close. |
| $Mpc_{40}Bma_{40}Spm_{40}$ | $CD_3OD$ | 0.8–1.1(3 peaks, b); 1.35(—C$\underline{H}_2$—CH$_3$); 1.55(—O—CH$_2$—C$\underline{H}_2$—); 1.8(b); 2.05 (b); 2.8 95(triplet, —C$\underline{H}_2$—S—); 3.24(s, $N^+$(C$\underline{H}_3$)$_3$); 3.7; 3.9–4.3(4 peaks, b), 4.6 | Integration yields formula as expected. |
| $Mpc_{40}Bma_{40}Tem_{40}$ | $CD_3OD$ | 0.8–1.2(2 peaks, b); 1.35(—C$\underline{H}_2$—CH$_3$); 1.55(—O—CH$_2$—C$\underline{H}_2$—); 2.1(b); 3.24 + 3.28 (overlapping, $N^+$(Me)$_3$ from Mpc and Tem); 3.6–4.7(7 peaks overlapping, b) | Cannot integrate Mpc vs. Tem, peaks to close. |

TABLE 4

Selected P:N & P:S Ratios for the Confirmation of Polymer Formula (where applicable)
Italics highlight cases where actual results significantly differ from those of the feed ratio.

| Polycation (molar feed ratio) | Mpc | Tem | % Phosphorus | % Nitrogen | Theoretical P:N | Actual P:N | % Mpc | % Tem |
|---|---|---|---|---|---|---|---|---|
| MpcTem | 50 | 50 | 4.8 | 4.9 | 0.904 | 1.021 | 39 | 56.5 |
| MpcBmaTem | 33.3 | 33.3 | 4.28 | 3.9 | 0.904 | 0.911 | 29.7 | 33.6 |
| Mpc$_{40}$Bma$_{40}$Tem$_{20}$ | 40 | 20 | 4.28 | 1.84 | 0.678 | 0.43 | *30* | *12.7* |
| MPc$_{15}$Bma$_{35}$Tem$_{50}$ | 15 | 50 | 2.17 | 3.91 | 1.957 | 1.802 | 13.9 | 46 |
| MpcTem$_2$ | 33.3 | 66.7 | 3.2 | 5.05 | 1.356 | 1.578 | *24.4* | *77.5* |
| Mpc$_{15}$Tem$_{85}$ | 15 | 85 | 1.7 | 5.31 | 3.019 | 3.124 | 12.1 | 87.9 |

| Polyanion (molar feed ratio) | Mpc | Spm | % Phosphorus | % Sulphur | Theoretical P:S | Actual P:S | % Mpc | % Spm |
|---|---|---|---|---|---|---|---|---|
| MpcSpm | 50 | 50 | 4.6 | 5.7 | 1.035 | 1.239 | 40.2 | 59.9 |
| MpcBmaSpm | 33.3 | 33.3 | 3.19 | 4.46 | 1.033 | 1.398 | *23.5* | *45.1* |
| Mpc$_{40}$Bma$_{40}$Spm$_{20}$ | 40 | 20 | 4.45 | 2.59 | 0.516 | 0.582 | 32.3 | 22.6 |
| Mpc$_{15}$Bma$_{35}$Spm$_{50}$ | 15 | 50 | 1.98 | 6.61 | 3.444 | 3.338 | 13.9 | 48.5 |
| Mpc$_{15}$Spm$_{85}$ | 15 | 85 | 1.75 | 10.5 | 5.869 | 6 | 14.3 | 86.9 |

TABLE 5

Polymer Feed and Final Formulas Based on NMR and Elemental Data Presented in Tables 4 & 5. Where fee ratios differs significantly from final ratio, the formula is shown in italics Inherent Viscosities obtained by Rheometry on 20% w/v Aqueous Solutions of the Polyions.

| Monomer Feed Formula | Suggested Final Polymer Formula | Inherent Viscosity (mPa · s) |
|---|---|---|
| Poly(Tem) | Poly(Tem) | 40 |
| MpcTem | MpcTem | 8.5 |
| MpcBmaTem | MpcBmaTem | 10 |
| Mpc$_{40}$Bma$_{40}$Tem$_{20}$ | *Mpc$_{30}$Bma$_{55}$Tem$_{15}$* | 18 |
| Mpc$_{15}$Bma$_{35}$Tem$_{50}$ | Mpc$_{15}$Bma$_{35}$Tem$_{50}$ | 14 |
| MpcTem$_2$ | *MpcTem$_3$* | 42 |
| Mpc$_{15}$Tem$_{85}$ | Mpc$_{15}$Tem$_{85}$ | 71 |
| Poly(Spm) | Poly(Spm) | 300 |
| MpcSpm | MpcSpm | 130 |
| MpcBmaSpm | *Mpc$_{25}$Bma$_{35}$Spm$_{40}$* | 11 |
| Mpc$_{40}$Bma$_{40}$Spm$_{20}$ | Mpc$_{40}$Bma$_{40}$Spm$_{20}$ | 6 |
| Mpc$_{15}$Bma$_{35}$Spm$_{50}$ | Mpc$_{15}$Bma$_{35}$Spm$_{50}$ | 10 |
| BmaSpm | BmaSpm | 14 |
| Mpc$_{15}$Spm$_{85}$ | Mpc$_{15}$Spm$_{85}$ | 250 |

TABLE 6

Some Observations Made upon Mixing Aqueous Solutions of Polyions.

| Polycation | Polyanion | Gel Formed? | Appearance | Comments |
|---|---|---|---|---|
| MpcTem | MpcSpm | No | Viscous liquid | |
| Mpc$_{15}$Tem$_{85}$ | Mpc$_{15}$Spm$_{85}$ | Yes | Thick gel | Opaque |
| MpcTem | SpmBma | Yes | Flowing gel | Opaque |
| MpcTem$_2$ | SpmBma | Yes | Thick gel | Opaque, expels water |
| MpcBmaTem | MpcBmaSpm | Yes | Flowing gel | Clear |
| Mpc$_{15}$Bma$_{35}$Tem$_{50}$ | Mpc$_{15}$Bma$_{35}$Spm$_{50}$ | Yes | Gel | Clear |
| Mpc$_{40}$Bma$_{40}$Tem$_{20}$ | Mpc$_{40}$Bma$_{40}$Tem$_{20}$ | Yes | Flowing gel | Opaque |
| MpcBmaTem | MpcSpm | No | Viscous liquid | |
| MpcTem | MpcBmaSpm | No | Viscous liquid | |
| Mpc$_{20}$Bma$_{60}$Tem$_{20}$ | Mpc$_{20}$Bma$_{60}$Spm$_{20}$ | — | — | Polymers water-insoluble |
| Poly(Tem) | Poly(Spm) | Yes | Very thick gel | Opaque, expels water |

TABLE 7

Viscoelastic Properties of Selected PIC gels

| Polycation | Polyanion | G' (Pa) | G" (Pa) |
|---|---|---|---|
| MpcTem | BmaSpm | 3.25 | 30 |
| MpcTem | BmaSpm | 600 | 800 |
| MpcTem | MpcSpm | 0.15 | 3.5 |
| MpcTem | MpcBmaSpm | 0.025 | 0.48 |
| MpcBmaTem | MpcSpm | 0.3 | 4 |
| MpcBmaTem | MpcBmaSpm | 50 | 45 |
| Mpc$_{15}$Bma$_{35}$Tem$_{50}$ | Mpc$_{15}$Bma$_{35}$Spm$_{50}$ | 400 | 150 |
| Mpc$_{15}$Tem$_{85}$ | Mpc$_{15}$Spm$_{85}$ | 1500 | 1000 |
| Mpc$_{40}$Bma$_{40}$Tem$_{20}$ | Mpc$_{40}$Bma$_{40}$Spm$_{20}$ | 85 | 125 |
| Poly(Tem) | Poly(Spm) | 9000 | 4500 |

TABLE 8

Estimation of Adsorbed Protein for PIC Coatings Using Fibrinogen (Fg) and bicinchoniic acid ($\mu$-BCA) Assays (Uncoated PET strip control)

| No | Polyion Complex Pair | Bioevaluation Test Method | % Reduction of Adsorbed Protein |
|---|---|---|---|
| 5.1 | MpcBmaTem + MpcBmaSpm | Fg (n = 7) | 77.8 |
| 5.2 | Mpc$_{15}$Bma$_{35}$Tem$_{50}$ + Mpc$_{15}$Bma$_{35}$Spm$_{50}$ | Fg (n = 7) | 77.7 |
| 5.3 | Poly(Tem) + Poly(Spm) | Fg (n = 7) | 47.1 |
| 5.1 | MpcBmaTem + MpcBmaSpm | $\mu$-BCA (n = 5) | 82.4 |

TABLE 8-continued

Estimation of Adsorbed Protein for PIC Coatings
Using Fibrinogen (Fg) and bicinchoniic acid ($\mu$-BCA) Assays
(Uncoated PET strip control)

| No | Polyion Complex Pair | Bioevaluation Test Method | % Reduction of Adsorbed Protein |
|---|---|---|---|
| 5.2 | $Mpc_{15}Bma_{35}Tem_{50}$ + $Mpc_{15}Bma_{35}Spm_{50}$ | $\mu$-BCA (n = 4) | 61.8 |
| 5.3 | Poly(Tem) + Poly(Spm) | $\mu$-BCA (n = 3) | 33.7 |

What is claimed is:

1. A process for forming a water swollen gel of a polyion complex by
   i) providing an aqueous solution containing 1 to 50% by weight of a cationic polymer having an overall cationic charge obtained by polymerising ethylenically unsaturated monomers comprising
      a) 5 to 100 mole % cationic monomer having a cationic or cationisable group;
      b) 0 to 85 mole % zwitterionic monomer having a pendant zwitterionic group; and
      c) 0 to 85 mole % nonionic monomer;
   ii) providing an aqueous solution containing 1 to 50% by weight of an anionic polymer having an overall anionic charge obtained by polymerising ethylenically unsaturated monomers including:
      d) 5 to 100 mole % anionic monomer having an anionic or anionisable group;
      e) 0 to 85 mole % zwitterionic monomer having a zwitterionic group; and
      f) 0 to 80 mole % nonionic monomer;
   iii) mixing the aqueous solution of anionic polymer and the aqueous solution of cationic polymer to form a polyion complex in amounts such that the total units in the polyion complex derivable from nonionic monomer c and f is in the range 0 to 60 mole %, the total mole % of units in the polyion complex derivable from zwitteronic monomer is in the range 1 to 70 mole %, and the ratio of moles of excess anionic or anionisable groups in the anionic polymer to the moles of excess cationic or cationsable groups in the cationic polymer is in the range 1.5:1 to 1:1.5, whereby a water-swollen gel of the polymer complex is formed, having up to ten parts by weight water from either the cationic polymer-containing aqueous solution, the anionic polymer-containing aqueous solution or both per part by weight total polymer, and if the cationic polymer-containing aqueous solution contains 0 mole % zwitterionic monomer, then the anionic polymer-containing aqueous solution contains zwitterionic monomer in an amount sufficient to provide a total mole % of units in the polyion complex derivable from zwittionic monomer in the range of 1 to 70 mole %, and if the anionic polymer-containing aqueous solution contains 0 mole % zwitterionic monomer, then the cationic polymer-containing aqueous solution contains zwitterionic monomer in an amount sufficient to provide a total mole % of units in the polyion complex derivable from zwitterionic monomer in the range of 1 to 70 mole %.

2. A process according to claim 1 in which the total of units derivable from nonionic monomer in the polyion complex is at least 5 mole %.

3. A process according to claim 1 in which the anionic polymer is formed from monomers substantially free of cationic monomer and the cationic polymer is formed of monomers substantially free of anionic monomer.

4. A process according to claim 1 in which aqueous solutions are mixed in amounts so that the ratio of total moles of anionic monomer used to form anionic polymer to total moles of cationic monomer used to form the cationic polymer is in the range 1.25:1 to 1:1.25.

5. A process according to claim 1 in which the polyion complex gel is water-insoluble.

6. A process according to claim 1 in which the zwitterionic monomer of the cationic polymer or the zwitterionic monomer of the anionic polymer or both has or have the formula VI $$YBX \qquad \qquad VI$$

wherein

B is selected from the group consisting of straight and branched alkanediyl, alkanediyloxaalkanediyl and alkanediyloligo(oxaalkanediyl), optionally containing one or more fluorine atoms and, if X or Y contains a terminal carbon atom bonded to B, a valence bond;

X is the zwitteronic group; and

Y is an ethylenically unsaturated polymerisable group selected from the group consisting of

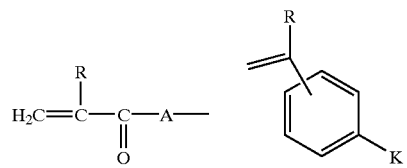

$CH_2=C(R)-CH_2-O-$, $CH_2=C(R)-CH_2OC(O)-$, $CH_2=C(R)OC(O)-$, $CH_2=C(R)-O-$, $CH_2=C(R)CH_2OC(O)N(R^{11})-$, $R^{12}OOCCR=CRC(O)-O-$, $RCH=CHC(O)O-$, $RCH=C(COOR^{12})CH_2-C(O)-O-$,

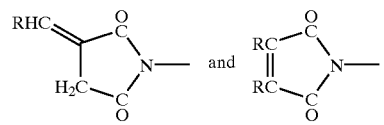

wherein:

R is hydrogen or a $C_1$-$C_4$ alkyl group;

$R^{11}$ is hydrogen or a $C_1$-$C_4$ alkyl group or $R^{11}$ is —B—X where B and X are as defined above; and $R^{12}$ is hydrogen or a $C_{1-4}$ alkyl group or BX where B and X are as defined above;

A is —O— or —$NR^{11}$—;

K is selected from the group consisting of —$(CH_2)_pOC(O)-$, —$(CH_2)_pC(O)O-$, $(CH_2)_pOC(O)O-$, —$(CH_2)_pNR^{13}-$, —$(CH_2)_pNR^{13}C(O)-$, —$(CH_2)_pC(O)NR^{13}-$, —$(CH_2)_pNR^{13}C(O)O-$, —$(CH_2)_pOC(O)NR^{13}-$, —$(CH_2)_pNR^{13}C(O)NR^{13}-$ (in which the groups $R^{13}$ are the same or different), —$(CH_2)_pO-$, —$(CH_2)_pSO_3-$, and optionally in combination with B, a valence bond and p is from 1 to 12 and $R^{13}$ is hydrogen or a $C_1$-$C_4$ alkyl group.

7. A process according to claim 6 in which the zwitterion has the formula IV

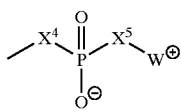 IV in which the moieties $X^4$ and $X^5$, which are the same or different, are selected from the group consisting of —O—, —S—, —NH— and a valence bond, and $W^+$ is a group comprising an ammonium, phosphonium or sulphonium cationic group and a $C_{1-12}$-alkanediyl group linking the anionic and cationic moieties.

8. A process according to claim 7 in which $W^+$ is a group of formula

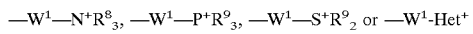

in which:

- $W^1$ is selected from the group consisting alkanediyl of 1 or more carbon atoms optionally containing one or more ethylenically unsaturated double or triple bonds, disubstituted-aryl, alkylene aryl, aryl alkylene, or alkylene aryl alkylene, disubstituted cycloalkyl, alkylene cycloalkyl, cycloalkyl alkylene and alkylene cycloalkyl alkylene, which group $W^1$ optionally contains one or more fluorine substituents and/or one or more functional groups; and
- either the groups $R^8$ are the same or different and each is selected from the group consisting of hydrogen, alkyl or 1 to 4 carbon atoms and aryl or two of the groups $R^8$ together with the nitrogen atom to which they are attached from a heterocyclic ring containing from 5 to 7 atoms or the three groups $R^8$ together with the nitrogen atom to which they are attached from a fused ring structure containing from 5 to 7 atoms in each ring, and optionally one or more of the groups $R^8$ is substituted by a hydrophilic functional group, and
- the groups $R^9$ are the same or different and each is $R^8$ or a group $OR^8$, where $R^8$ is as defined above;
- Het is an aromatic nitrogen-, phosphorus- or sulphur-containing ring.

9. A process according to claim 8 in which the zwitterion is a group of formula V:

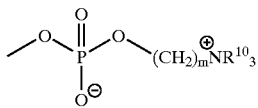 V where the groups $R^{10}$ are the same or different and each is hydrogen or $C_{1-4}$ alkyl, and m is from 1 to 4.

10. A process according to claim 1 in which the anionic monomer and cationic monomer each have the formula VII

 VII in which $Y^1$ is an ethylenically unsaturated polymerisable group selected from the group consisting of

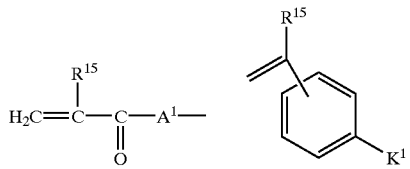

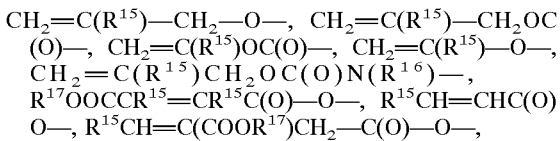

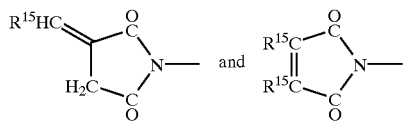

wherein:
- $R^{15}$ is hydrogen or a $C_1$–$C_4$ alkyl group;
- $R^{16}$ is hydrogen or a $C_1$–$C_4$ alkyl group or $R^{16}$ is $B^1Q$ where $B^1$ and Q are as defined below;
- $R^{17}$ is hydrogen or a $C_{1-4}$ alkyl group or $B^1Q$ where $B^1$ and Q are as defined below;
- $A^1$ is —O— or —$NR^{16}$—;
- $K^1$ is selected from the group consisting of —$(CH_2)_r OC(O)$—, —$(CH_2)_r C(O)O$—, —$(CH_2)_r OC(O)O$—, —$(CH_2)_r NR^{18}$—, —$(CH_2)_r NR^{18}C(O)$—, —$(CH_2)_r C(O)NR^{18}$—, —$(CH_2)_r NR^{18}C(O)O$—, —$(CH_2)_r OC(O)NR^{18}$—, —$(CH_2)_r NR^{18}C(O)NR^{18}$— (in which the groups $R^{18}$ are the same or different), —$(CH_2)_r O$—, —$(CH_2)_r SO_3$—, and optionally in combination with $B^1$, a valence bond and r is from 1 to 12 and $R^{18}$ is hydrogen or a $C_1$–$C_4$ alkyl group;
- $B^1$ is selected from the group consisting of straight and branched alkanediyl, oxaalkylene, alkanediyloxaalkanediyl, and alkanediyloligo(oxaalkanediyl) chain optionally containing one or more fluorine atoms and if Q or $Y^1$ contains a terminal carbon atom bonded to $B^1$ a valence bond; and
- Q is the ionic or ionisable group.

11. A process according to claim 10 in which Q is a cationic group $Q^1$ which is a group $N^+R^1_3$, $P^+R^1_3$ or $S^+R^1_2$
in which the groups $R^1$ are the same or different and are each hydrogen, $C_{1-4}$ alkyl or aryl or two or three of the groups $R^1$ together with the heteroatom to which they are attached from a saturated or unsaturated heterocyclic ring containing from 5 to 7 atoms.

12. A process according to claim 10 in which Q is a cationic group $Q^2$ which is selected from carboxylate, carbonate, sulphonate, sulphate, phosphonate and phosphate.

13. A process according to claim 1 in which the cationic monomer is diallyl dialkyl ammonium halide.

14. A process according to claim 1 in which the nonionic monomer of the cationic polymer or the nonionic monomer of the anionic polymer or both has or have the general formula VIII

 VIII in which $Y^2$ is an ethylenically unsaturated polymerisable group selected from the group consisting of

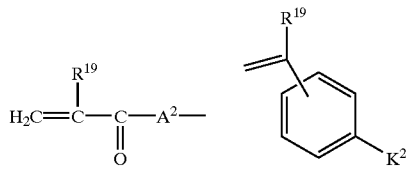

CH$_2$=C(R$^{19}$)—CH$_2$—O—, CH$_2$=C(R$^{19}$)—CH$_2$OC(O)—, CH$_2$=C(R$^{19}$)OC(O)—, CH$_2$=C(R$^{19}$)—O—, CH$_2$=C(R$^{19}$)CH$_2$OC(O)N(R$^{20}$)—, R$^{21}$OOCCR$^{19}$=CR$^{19}$C(O)—O—, R$^{19}$CH=CHC(O)O—, R$^{19}$CH=C(COOR$^{21}$)CH$_2$—C(O)—O—,

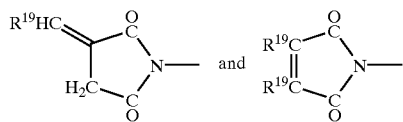

and wherein:

R$^{19}$ is hydrogen or a C$_1$–C$_4$ alkyl group;

R$^{20}$ is hydrogen or a C$_1$–C$_4$ alkyl group or R$^{20}$ is R$^{14}$;

R$^{21}$ is hydrogen or a C$_1$–C$_4$ alkyl group or R$^{21}$ is R$^{14}$;

A$^2$ is —O— or —NR$^{20}$—;

K$^2$ is selected from the group consisting of —(CH$_2$)$_s$OC(O)—, —(CH$_2$)$_s$C(O)O—, —(CH$_2$)$_s$OC(O)O—, —(CH$_2$)$_s$NR$^{22}$—, —(CH$_2$)$_s$NR$^{22}$C(O)—, —(CH$_2$)$_s$C(O)NR$^{22}$—, —(CH$_2$)$_s$NR$^{22}$C(O)O—, —(CH$_2$)$_s$OC(O)NR$^{22}$—, —(CH$_2$)$_s$NR$^{22}$C(O)NR$^{22}$— (in which the groups R$^{22}$ are the same or different), —(CH$_2$)$_s$O—, —(CH$_2$)$_s$SO$_3$—, and a valence bond and s is from 1 to 12 and R$^{22}$ is hydrogen or a C$_1$–C$_4$ alkyl group; and R$^{14}$ is an optionally substituted C$_{1-24}$-alkyl or -alkenyl group, optional substituents being selected from the group consisting of hydroxyl groups; halogen atoms; alkoxy and oligo-alkoxy groups, in which the alkoxy groups have 1–6 carbon atoms; aryl groups, acyl groups; acyloxy group and acylamino groups.

15. A process according to claim 14 in which R$^{14}$ is C$_{4-18}$-unsubstituted alkyl.

16. A process according to claim 1 in which the gel, when fully swollen in water, has viscoelastic properties (determined using a variable torque oscillation test (80 mN.m) using a TA instrument CSL-100 rheometer fitted with 6 cm 2° cone at 37° C., G' (elasticity modulus)) in the range 1 to 1000 and G" (viscous modulus) in the range 1.5 to 1000.

17. A process according to claim 1 in which one of the aqueous solutions further comprises an active agent selected from pharmaceutically active agents and diagnostic agents.

18. A process according to claim 11 in which Q is —N$^+$R$^1_3$ in which each R$^1$ is C$_{1-4}$-alkyl.

19. A process according to claim 12 in which Q$^2$ is a sulphonate group.

20. A process according to claim 6 in which the anionic monomer and cationic monomer each have the formula VII $$Y^1B^1Q \qquad \qquad VII$$

in which Y$^1$ is an ethylenically unsaturated polymerisable group selected from the group consisting of

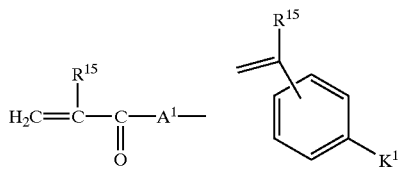

CH$_2$=C(R$^{15}$)—CH$_2$—O—, CH$_2$=C(R$^{15}$)—CH$_2$OC(O)—, CH$_2$=C(R$^{15}$)OC(O)—, CH$_2$=C(R$^{15}$)—O—, CH$_2$C(R$^{15}$)CH$_2$OC(O)N(R$^{16}$)—, R$^{17}$OOCCR$^{15}$=CR$^{15}$C(O)—O—, R$^{15}$CH=CHC(O)O—, R$^{15}$CH=C(COOR$^{17}$)CH$_2$—C(O)—O—,

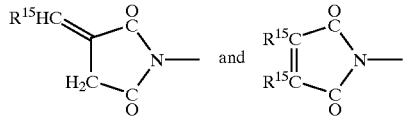

and wherein:

R$^{15}$ is hydrogen or a C$_1$–C$_4$ alkyl group;

R$^{16}$ is hydrogen or a C$_1$–C$_4$ alkyl group or R$^{16}$ is B$^1$Q where B$^1$ and Q are as defined below;

R$^{17}$ is hydrogen or a C$_{1-4}$ alkyl group or B$^1$Q where B$^1$ and Q are as defined below;

A$^1$ is —O— or —NR$^{16}$—;

K$^1$ is selected from the group consisting of —(CH$_2$)$_r$OC(O)—, —(CH$_2$)$_r$C(O)O—, —(CH$_2$)$_r$OC(O)O—, —(CH$_2$)$_r$NR$^{18}$—, —(CH$_2$)$_r$NR$^{18}$C(O)—, —(CH$_2$)$_r$C(O)NR$^{18}$—, —(CH$_2$)$_r$NR$^{18}$C(O)O—, —(CH$_2$)$_r$OC(O)NR$^{18}$, —(CH$_2$)$_r$NR$^{18}$C(O)NR$^{18}$— (in which the groups R$^{18}$ are the same or different), —(CH$_2$)$_r$O—, —(CH$_2$)$_r$SO$_3$—, and optionally in combination with B$^1$, a valence bond and r is from 1 to 12 and R$^{18}$ is hydrogen or a C$_1$–C$_4$ alkyl group;

B$^1$ is selected from the group consisting of straight and branched alkanediyl, oxaalkylene, alkanediyloxaalkanediyl, and alkanediyloligo (oxaalkanediyl) chain optionally containing one or more fluorine atoms and if Q or Y$^1$ contains a terminal carbon atom bonded to B$^1$ a valence bond; and Q is the ionic or ionisable group.

21. A process according to claim 20 in which Q is a cationic group Q$^1$ which is a group N$^+$R$^1_3$, P$^+$R$^1_3$ or S$^+$R$^1_2$ in which the groups R$^1$ are the same or different and are each hydrogen, C$_{1-4}$-alkyl or aryl or two or three of the groups R$^1$ together with the heteroatom to which they are attached from a saturated or unsaturated heterocyclic ring containing from 5 to 7 atoms.

22. A process according to claim 21 in which Q is N$^+$R$^1_3$ in which each R$^1$ is C$_{1-4}$-alkyl.

23. A process according to claim 20 in which Q is an anionic group Q$^2$ which is selected from carboxylate, carbonate, sulphonate, sulphate, phosphonate and phosphate.

24. A process according to claim 23 in which Q$^2$ is a sulphonate.

25. A process according to claim 6 in which the cationic monomer is diallyl dialkyl ammonium halide.

26. A process according to claim 6 in which the nonionic monomer of the cationic polymer or the nonionic monomer of the anionic polymer or both has or have the general formula VIII $$Y^2R^{14} \qquad \qquad VIII$$

in which $Y^2$ is an ethylenically unsaturated polymerisable group selected form the group consisting of

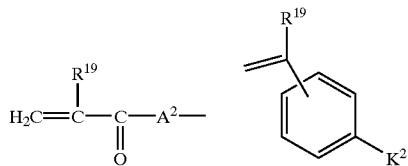

$CH_2=C(R^{19})-CH_2-O-$, $CH_2=C(R^{19})-CH_2OC(O)-$, $CH_2=C(R^{19})OC(O)-$, $CH_2=C(R^{19})-O-$, $CH_2=C(R^{19})CH_2OC(O)N(R^{20})-$, $R^{21}OOCCR^{19}=CR^{19}C(O)-O-$, $R^{19}CH=CHC(O)O-$, $R^{19}CH=C(COOR^{21})CH_2-C(O)-O-$,

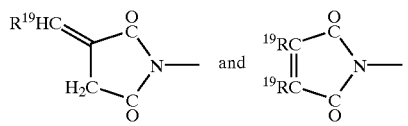

wherein:
$R^{19}$ is hydrogen or a $C_1$-$C_4$ alkyl group;
$R^{20}$ is hydrogen or a $C_1$-$C_4$ alkyl group or $R^{20}$ is $R^{14}$;
$R^{21}$ is hydrogen or a $C_1$-$C_4$ alkyl group or $R^{21}$ is $R^{14}$;
$A^2$ is —O— or —$NR^{20}$—;
$K^2$ is selected form the group consisting of —$(CH_2)_sOC(O)-$, —$(CH_2)_sC(O)O-$, —$(CH_2)_sOC(O)O-$, —$(CH_2)_sNR^{22}-$, —$(CH_2)_sNR^{22}C(O)-$, —$(CH_2)_sC(O)NR^{22}-$, —$(CH_2)_sNR^{22}C(O)O-$, —$(CH_2)_sOC(O)NR^{22}-$, —$(CH_2)_sNR^{22}C(O)NR^{22}-$ (in which the groups $R^{22}$ are the same or different), —$(CH_2)_sO-$, —$(CH_2)_sSO_3-$, and a valence bond and s is from 1 to 12 and $R^{22}$ is hydrogen or a $C_1$-$C_4$ alkyl group; and
$R^{14}$ is an optionally substituted $C_{1-24}$-alkyl or -alkenyl group, optional substituents being selected from the group consisting of hydroxyl groups; halogen atoms; alkoxy and oligo-alkoxy groups, in which the alkoxy groups have 1–6 carbon atoms; aryl groups, acyl groups; acyloxy groups and acylamino groups.

27. A process according to claim 26 in which $R^{14}$ is $C_{4-18}$-unsubstituted alkyl.

28. A process according to claim 27 in which one of the aqueous solutions further comprises an active agent selected from the group consisting of pharmaceutically active agents and diagnostic agents.

29. A process according to claim 1 in which the said aqueous solutions are mixed in amounts such that the total mole % of units in the polyion complex derivable from ionic monomer is in the range 10 to 30 mole % and the total mole % of units in the polyion complex derivable from zwitterionic monomer is in the range 50 to 70 mole %.

30. A process according to claim 1 wherein the said aqueous solutions are mixed in amounts such that the total units in the polyion complex derivable from ionic monomer is in the range 5 to 10 mole % and the total mole % of units in the polyion complex derivable from zwitteronic monomer is in the range 70 to 30 mole %.

31. A method of forming a swollen gel of a polyion complex comprising the steps:
a) forming a solution of an anionic polymer having an overall anionic charge and a cationic polymer having an overall cationic charge in a solvent system comprising a first solvent and an inorganic salt which is water-soluble and formed of monovalent metal ions and monovalent counterions,
b) contacting the solution formed in step a) with water, whereby the ions of the inorganic salts become dissociated from the polymer and are extracted and a gel is formed by electrostatic attraction between polymer bound cationic groups of the cationic polymer and polymer bound anionic groups of the anionic polymer wherein at least one of the cationic and anionic polymers comprises zwitterionic groups, whereby a water-swollen gel of the polymer complex is formed having up to ten parts by weight of the water introduced in step (b) per part by weight total polymer.

32. A method according to claim 31 in which said first solvent is an organic solvent.

33. A method according to claim 31 in which said solvent system comprises first and second solvents which are miscible under the conditions of the process.

34. A method according to claim 33 in which the said second solvent is water.

35. A method according to claim 33 in which the ratio of first to second solvent is in the range 2:1–1:10.

36. A method according to claim 31 in which the organic salt is a halide of an alkali metal.

37. A method according to claim 31 in which the anionic polymer is obtainable by polymerising ethylenically unsaturated monomers comprising:
a) 5 to 100 mole % anionic monomer having an anionic or anionisable group;
b) 0 to 85 mole % zwitterionic monomer having a zwitterionic group; and
c) 0 to 80 mole % nonionic monomer;
and in which the cationic polymer is obtainable by polymerising ethylenically unsaturated monomers including
d) 5 to 100 mole % cationic monomer having a cationic or cationisable group;
e) 0 to 85 mole % zwitterionic monomer having a pendant zwitterionic group; and
f) 0 to 80 mole % non ionic monomer;
in which the total units in the polyion complex derivable from nonionic monomer c and f is in the range 0 to 60 mole %, the total mole % of units in the polyion complex derivable from zwitterionic monomer is in the range 1 to 70 mole %, the ratio of moles of excess anionic or anionisable groups in the anionic polymer to the moles of excess cationic or cationisable groups in the cationic polymer is in the range 1:5:1 to 1:1.5, and if the cationic polymer-containing aqueous solution contains 0 mole % zwitterionic monomer, then the anionic polymer-containing aqueous solution contains zwitterionic monomer in an amount sufficient to provide a total mole % of units in the polyion complex derivable from zwittionic monomer in the range of 1 to 70 mole %, and if the anionic polymer-containing aqueous solution contains 0 mole % zwitterionic monomer, then the cationic polymer-containing aqueous solution contains zwitterionic monomer in an amount sufficient to provide a total mole % of units in the polyion complex derivable from zwitterionic monomer in the range of 1 to 70 mole %.

38. A method according to claim 36 in which the organic salt is sodium chloride.

* * * * *